Patented Jan. 2, 1923.

1,440,683

UNITED STATES PATENT OFFICE.

CARL O. JOHNS AND HYYM E. BUC, OF ROSELLE, NEW JERSEY, ASSIGNORS, BY MESNE ASSIGNMENTS, TO STANDARD DEVELOPMENT COMPANY, OF NEW YORK, N. Y., A CORPORATION OF DELAWARE.

ART OF PRODUCING NORMAL PROPYL CHLORIDE.

No Drawing.   Application filed March 11, 1921.  Serial No. 451,543.

*To all whom it may concern:*

Be it known that we, CARL O. JOHNS and HYYM E. BUC, citizens of the United States, residing at Roselle, in the county of Union and State of New Jersey, have invented a new and useful Improvement in the Art of Producing Normal Propyl Chloride, of which the following is a specification.

The present invention relates to the production of normal propyl chloride from normal propyl alcohol, and will be fully understood from the following description of a process for carrying out the same.

In accordance with the present invention hydrochloric acid is caused to react upon normal propyl alcohol in the presence or absence of water, and preferably at atmospheric pressure. The reaction may suitably be carried out in a still provided with a dephlegmator or column cooled in such manner that the vapor outlet is approximately at the boiling point of normal propyl chloride (say 45 to 47° C.), whereby vaporized water, propyl alcohol or hydrochloric acid solution is returned to the still and substantially only the propyl chloride is permitted to escape, for subsequent condensation.

The reaction may suitably be carried out by placing in a still equal volumes of concentrated aqueous hydrochloric acid solutions (about 35% HCl) and normal propyl alcohol. The still may suitably be equipped with a reflux condenser or dephlegmator cooled in such manner that its outlet has a temperature of about 45 to 47° C. Heat is then applied to the still, the reaction taking place mainly after the contents of the still reach their boiling temperature, although it begins at a lower temperature. The normal propyl chloride vapors coming off from the dephlegmator are condensed and the chloride collected.

In the example given a hydrochloric acid concentration in the mixture of propyl alcohol and water of about 16 to 17% is described. The concentration of hydrochloric acid may be varied. When it is substantially less than the concentration recited, the reaction may take place at a somewhat slower rate; and when the hydrochloric acid concentration is greater, some hydrochloric acid gas may escape with the propyl chloride vapor. If desired, the reaction may be made substantially continuous by replenishing the propyl alcohol and the hydrochloric acid, preferably by means of HCl gas, in approximately the proportions in which they are used. If desired, the reaction may be made substantially anhydrous by using anhydrous alcohol and dissolving in it hydrochloric acid gas to a suitable concentration, say 16 to 18%. The mixture may then be slowly heated to produce the reaction and hydrochloric acid gas may be introduced during reaction to maintain the desired concentration.

Although the present invention has been described in connection with the details of a specific example thereof, it is not intended that these details shall be regarded as limitations upon the scope of the invention except in so far as included in the accompanying claims.

We claim:

1. The process of preparing normal propyl chloride which comprises introducing hydrochloric acid into normal propyl alcohol, distilling the mixture at atmospheric pressure and collecting the evolved normal propyl chloride vapors.

2. The process of preparing normal propyl chloride which comprises admixing and heating normal propyl alcohol and hydrochloric acid in the presence of water and removing and collecting the evolved normal propyl chloride vapors.

3. The process of preparing normal propyl chloride which comprises treating normal propyl alcohol with hydrochloric acid, heating the mixture under atmospheric pressure, refluxing to the heated mixture the portion of the evolved vapors condensing above about 45 to 47° C., and withdrawing the remaining concentrated propyl chloride vapors.

4. The process of preparing normal propyl chloride which comprises mixing normal propyl alcohol and a solution of HCl to produce a mixture of 16 to 18% HCl concentration and heating the mixture, whereby isopropyl chloride vapors are evolved.

5. The process of preparing normal propyl chloride which comprises mixing normal propyl alcohol and hydrochloric acid in the presence of water, heating the mixture, and returning to the mixture the portion of the evolved vapors condensing above about 45–47° C. and withdrawing the remaining concentrated propyl chloride vapors.

6. The process of preparing normal propyl chloride which comprises forming a mixture of water, propyl alcohol and hydrochloric acid, heating the mixture whereby normal propyl chloride vapors are evolved, and replenishing the hydrochloric acid of the mixture.

7. The process of preparing normal propyl chloride which comprises forming a mixture of water, normal propyl alcohol and hydrochloric acid, heating the mixture whereby normal propyl chloride vapors are evolved, and replenishing the propyl alcohol of the mixture.

8. The process of preparing normal propyl chloride which comprises mixing equal volumes of propyl alcohol and hydrochloric acid of about 35% concentration and distilling the mixture at atmospheric pressure.

CARL O. JOHNS.
HYYM E. BUC.